United States Patent
Hischke et al.

(10) Patent No.: US 7,580,421 B2
(45) Date of Patent: Aug. 25, 2009

(54) METHOD AND DEVICE FOR CONTROLLING DATA CONNECTIONS IN A DATA NETWORK HAVING A PLURALITY OF DATA NETWORK NODES

(75) Inventors: Sven Hischke, Troisdorf (DE); Erik Weiss, Vaals (NL); Bangnan Xu, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 500 days.

(21) Appl. No.: 10/559,071

(22) PCT Filed: May 17, 2004

(86) PCT No.: PCT/DE2004/001037

§ 371 (c)(1),
(2), (4) Date: Jun. 7, 2006

(87) PCT Pub. No.: WO2004/109988

PCT Pub. Date: Dec. 16, 2004

(65) Prior Publication Data

US 2007/0104094 A1 May 10, 2007

(30) Foreign Application Priority Data

Mar. 30, 2003 (DE) ................. 103 24 470

(51) Int. Cl.
H04J 3/22 (2006.01)
(52) U.S. Cl. ................. 370/465; 370/235; 370/329
(58) Field of Classification Search ................. 370/465,
370/466, 468, 432, 437, 442, 443, 328, 329, 370/331, 332, 333, 341, 348, 230, 230.1, 370/232, 233, 234, 235, 236, 225, 228
See application file for complete search history.

(56) References Cited

U.S. PATENT DOCUMENTS

| 4,417,348 | A | | 11/1983 | Abbruscato |
| 5,490,168 | A | * | 2/1996 | Phillips et al. ............... 375/224 |
| 5,574,774 | A | * | 11/1996 | Ahlberg et al. ........... 455/422.1 |
| 5,920,545 | A | | 7/1999 | Raesaenen et al. |
| 6,496,489 | B1 | * | 12/2002 | Raith et al. .................. 370/328 |
| 6,646,995 | B1 | * | 11/2003 | Le Strat et al. .............. 370/252 |

(Continued)

FOREIGN PATENT DOCUMENTS

EP 0903883 3/1999

(Continued)

OTHER PUBLICATIONS

Xiao-Hui Lin et al.; "RICA: A Receiver-Initiated Approach for Channel-Adaptive On-Demand Routing in Ad Hoc Computing Networks," Dept. of Electrical and Electronic Engineering, The University of Hong Kong, IEEE Computer Society, 2002.

*Primary Examiner*—Chi H. Pham
*Assistant Examiner*—Kevin Mew
(74) *Attorney, Agent, or Firm*—Kenyon & Kenyon LLP (57) ABSTRACT

A method and a device for controlling data connections in a data network including a plurality of data network nodes. The quality of a first data connection is evaluated on the basis of the adaptations of at least one coding used for the first data connection, and a second data connection is established according to the evaluation and used as a replacement for the first data connection.

11 Claims, 3 Drawing Sheets

U.S. PATENT DOCUMENTS

| | | | |
|---|---|---|---|
| 6,728,259 B1 * | 4/2004 | Gronberg | 370/465 |
| 6,937,582 B1 * | 8/2005 | Kronestedt | 370/329 |
| 2002/0080719 A1 * | 6/2002 | Parkvall et al. | 370/235 |
| 2002/0114284 A1 * | 8/2002 | Kronestedt et al. | 370/252 |
| 2003/0040316 A1 | 2/2003 | Stanforth et al. | |
| 2003/0112744 A1 * | 6/2003 | Baum et al. | 370/206 |
| 2003/0123477 A1 * | 7/2003 | Gollamudi et al. | 370/465 |
| 2003/0123598 A1 * | 7/2003 | Gollamudi et al. | 375/377 |
| 2004/0013095 A1 * | 1/2004 | Western et al. | 370/328 |
| 2006/0114315 A1 * | 6/2006 | Crook | 348/14.08 |

FOREIGN PATENT DOCUMENTS

| | | |
|---|---|---|
| EP | 1255368 | 11/2002 |
| EP | 1276265 | 1/2003 |
| WO | WO 00/42743 | 7/2000 |

* cited by examiner

METHOD AND DEVICE FOR CONTROLLING DATA CONNECTIONS IN A DATA NETWORK HAVING A PLURALITY OF DATA NETWORK NODES

FIELD OF THE INVENTION

The present invention relates to a method for controlling data connections in a data network having a plurality of data network nodes.

BACKGROUND INFORMATION

In data networks having a plurality of data network nodes, a data connection takes place from a source to a destination via a route, link, or path, in the data network which includes a certain number of data network nodes. In an end-to-end connection in such a data network, therefore, data packets run from the source to the destination via a plurality of data network nodes. These data network nodes work like relay stations.

In a data network having dynamic or mobile data network nodes, for example, a radio communications network having mobile radio terminals as data network nodes, the transmission quality of a data connection fluctuates as a rule. Such data networks are expected to gain increasing importance in the future, for example, because of the wide distribution of wireless LAN networks occurring in the meantime, and the introduction of UMTS (universal mobile telecommunications system). Therefore, when working with such data networks one desires to achieve a high data transmission rate, in spite of the fluctuating transmission quality.

In radio communications networks, a distinction is made between subscriber networks and ad hoc networks. Ad hoc networks permit a self-organizing organization. Since, the radio range in radio systems having a high data rate is limited, so-called multihop data connections are increasingly used in data networks. For example, in an ad hoc radio communications network, individual laptop computers may be used as data network nodes which are provided with a radio interface operated in ad hoc mode. Multihop data connections are used, above all, when the destination is not located in the direct radio range of the source. The connection setup, the connection finding and the restoration of connections are ensured by special routing protocols.

As soon as a data connection between a source and a destination has been found and set up, it may be used for data transport. Depending on the dynamics of the data network nodes participating in the data connection, the quality of the data connection may now change continuously. The data connection may be interrupted if a data network node participating in the data connection moves out of the radio range of its adjacent data network node. In such a case, a data network node adjacent to the breaking point informs the source about the breaking point in the data connection. The source then tries again to set up a new connection to the destination. To do this, the source initiates the renewed transmission of a so-called connection search message, which is sent through the entire data network. In this case, one speaks of "flooding" the data network, since the connection search message "floods" the entire data network. This "flooding" is a high requirement for network capacity. In addition, the network capacity required for the "flooding" is not available to other network connections.

Moreover, upon breaking a data connection, no data transport is possible any longer between source and destination. Data packets which were already sent from the source to the destination, but which could not pass the breaking point in time, are lost. Thus, such data packets must be sent again by the source to the destination, resulting in an increase in packet delay as well as a waste of capacity in packet-oriented data networks. In transport protocols, such as TCP (transport control protocol) used on the Internet, these great delays lower the throughput of a data connection, and therewith of the entire data network.

In order to achieve an especially high quality in a data connection, one desires the continuity of an end-to-end connection. This applies if commercial services are to be offered over such data networks.

SUMMARY OF THE INVENTION

Embodiments of the present invention may provide a method and a device for controlling data connections in a data network having a plurality of data network nodes, which are able to ensure an end-to-end data connection that is as free of interruptions as possible.

Embodiments of the present invention may provide a method and a device for controlling data connections in a data network possessing a plurality of data network nodes.

Embodiments of the present invention may involve the judging of the quality of a data connection in a data network having a plurality of data network nodes according to the coding used. Here, the term coding is used for the combinations of physical transmission methods employed. For example, the combination of modulation and puncturation in the OFDM method, or the various chip rates in the CDMA method. In this context, a high coding corresponds to a high data rate. The data are transmitted in differently coded fashion over a data connection so as to assure a transmission that is as secure and interference-resistant as possible, as a function of channel quality. Especially in radio communications networks that are used as data networks, coding is useful for a sufficient transmission quality. In most data networks, various coding methods are used, which may be adapted dynamically to the quality of a data connection. This means that, when there is a deterioration in the quality of a data connection, the coding method is adapted to the deteriorated data connection. This is the case in radio communications networks such as WLAN's, according to the IEEE 802.11 standard or the ETSI HIPERPLAN/2 standard in GSM/GPRS, CDMA and UMTS mobile radio networks. Thus, the coding method used for a data connection reflects the quality of the data connection. By evaluating the coding methods used for a data connection, for example, with the characteristic of the coding methods used, it is now possible to assess the quality of a first data connection, and depending on that, a second data connection may be set up which is used as a substitute data connection in case of the breakdown or in the case of a severe interference in the first data connection.

Embodiments of the present invention may detect the breakdown of a data connection, or a threatening interruption in the data connection, in timely fashion, and ensure that an alternative data connection is searched for and found. In some embodiments of the present invention, at the moment of a disconnection of the first data connection, or even earlier, it may be possible to change to a second data connection without any delay. This leads to a reduction of the control signals in the data network, especially of connection search messages which, up to now, were sent out by a source after the disconnection of a data connection for the purpose of finding a new data connection. In addition, packet losses are minimized or considerably reduced, if not really completely eliminated.

Finally, data or data packets are also prevented from having to be transmitted again in response to a disconnection of the data connection.

Embodiments of the present invention relate to a method and a device for controlling data connections in a data network having a plurality of data network nodes, in which the quality of a first data connection is assessed in light of the adaptations of one or more codings used for the first data connection, and, depending on the assessment, a second data connection is set up that is used as replacement for the first data connection. Radio terminals that act like data relay stations may serve here as data network nodes. The coding of data of a data connection here is to be dynamic, that is, can be adapted as a function of the transmission quality of the data connection used. By the assessment of the adaptations of one or even several codings, a prediction may be made as to whether the first data connection will be interrupted in future.

In embodiments of the present invention, the assessment of the quality of the first data connection may be made in that, in light of the codings used, at least one first data network node, participating in the first data connection, makes a statement as to whether the first data connection is becoming unstable. For example, in a radio communications network, a first radio terminal, acting as a data network node, is able to evaluate the quality of the data connection to an adjacent second radio terminal by the coding method used for the data transmission between the two radio terminals. If the radio connection deteriorates, the transmitting terminal changes the coding for its partial connection. If this occurs several times in succession, it may be assumed that the data connection between these two radio terminals will possibly be interrupted in the future. Since the receiving terminal also detects these changes in light of the coding that the transmitting terminal is using, each of the two terminals is able to make the statement as to whether the data connection will become unstable.

In embodiments of the present invention, in response to a statement that the data connection will become unstable, it is able to initiate the search for a second data connection. The search may be initiated, for example, by the emitting of a first message by the at least one first data network node that has made the statement that the first data connection is becoming unstable. In this context, the first message is sent to second data network nodes, for instance, to the data network nodes adjacent to the first data network node.

In embodiments of the present invention, the message may include the number of transmissions, the address of a transmitter and the address of a receiver of data of the first data connection. The number of transmissions ("time to life": TTL) is understood to mean the number of partial transmissions for which data packets of the first data connection are able to be transmitted and maintained until they are discarded or become invalid.

In embodiments of the present invention, the message is sent with a different coding than the coding(s) used in the first data connection. Because of this, only those data network nodes which are able to receive and decode the differently encoded messages, are able to process the message. For example, data network nodes are not able to process the message if they are outside the reception range of the coding used. This procedure can effectively prevent data network nodes of the first data connection from becoming a part of the second data network connection.

In embodiments of the present invention, the new coding may be a higher coding than the coding(s) used in the first data connection, which means the message is not able to be transmitted over connections between data network nodes that have a bad transmission quality. This avoids routes that are not considered stable.

In embodiments of the present invention, the second data connection may be utilized when the first data connection is disconnected. Alternatively, the second data connection may also already be utilized if a prespecified coding is used for the first data connection, for instance, an especially robust, that is, low coding at a very poor transmission quality.

Embodiments of the present invention may relate to a device for controlling data connections in a data network having a plurality of data network nodes, which are designed in such a way that the quality of a first data connection is assessed in light of the adaptations of one or more codings used for the first data connection, and, depending on the assessment, a second data connection is set up that is used as replacement for the first data connection.

In embodiments of the present invention, at least one first data network node participating in the first data connection is designed to assess the quality of the first data connection in that, in light of the codings used, it makes a statement as to whether the first data connection is becoming unstable. The at least one first data network node may, for example, be set up by program technology for carrying out the aforementioned assessment. If the at least one first data network node includes a radio interface, such as a plug-in card for a personal computer such as a PCI card or a PC card for a laptop computer or a USB radio adapter, its(their) operating program may be correspondingly set up. Radio interfaces that are already present, having an operating software in a programmable memory may be updated correspondingly.

In embodiments of the present invention, the at least one first data network node may be designed so that, in response to a statement that the first data connection is becoming unstable, it initiates the search for the second data connection.

In embodiments of the present invention, the at least one first data network node may be designed to initiate the search by sending a first message to second data network nodes.

In embodiments of the present invention, the message may include the number of transmissions, the address of a transmitter and the address of a receiver of data of the first data connection.

In embodiments of the present invention, the message may have a different coding than the coding(s) used in the first data connection.

In embodiments of the present invention, the different coding may have a higher coding than the coding(s) used in the first data connection.

Embodiments of the present invention may be designed to switch over to the second data connection if the first data connection is disconnected.

Alternatively, or even additionally, the device may be designed to switch over to the second data connection if a prespecified coding is used for the first data connection.

In embodiments of the present invention, the data network may include a radio data network and at least two of the data network nodes are radio terminals. This means that a data connection in such a data network is able to include a radio transmission link whose transmission quality depends, among other things, on the motion of at least one of the terminals participating in the radio transmission link.

DETAILED DESCRIPTION

Some exemplary embodiments of the present invention, described below, for the dynamic adaptation of multihop data connections in data networks having a plurality of data network nodes are, in principle, independent of a predictive method for the behavior of a data connection. In the exemplary embodiments, the assumption is made that a data network node, which is part of a data connection, monitors the quality of the data connection with respect to the coding method(s) used according to the present invention.

This data network node divides the data connection into two parts: an input side part, which is the part of the data connection on the side of the source between either the source or a predecessor data network node and the data network node, and an output side part, which is the part of the data connection between the data network node and either the destination or a subsequent data network node in the direction towards the destination. Therefore, it is able to recognize the three following different situations with respect to the input-side and the output-side part of the data connection:

1. The quality of the output-side data connection part deteriorates, and, accordingly, more stable coding methods are selected for the partial data connection. The conditions of the input-side data connection part remain constant. From this, the data network node is able to conclude that the destination or a data network node that belongs to the output-side part of the data connection is distancing itself from it.

2. Both on the input-side part and the output-side part of the data connection, the transmission quality is deteriorating, and therefore more stable coding methods are selected. This means that the data network node itself is moving.

3. The quality of the input-side part of the data connection is deteriorating, and a more stable coding method is selected. However, the quality of the output-side part of the data connection remains the same. From this, it may be concluded that the source or a data network node of the input-side part of the data connection is moving away from the data network node.

All the above-named situations are now able to be recognized and evaluated, as will be shown below in light of the explanation of various exemplary embodiments.

The first exemplary embodiment of the method according to the present invention is based on a well-timed data connection adaptation. This will also be designated below as early route rearrangement (ERRA). An appropriate ERRA protocol relates, for example, to a method that changes the route or the data connection if it is predicted that an interruption of an existing data connection threatens. The ERRA method is started before a data connection is disconnected, for instance, if a data network node of the data connection moves out of the radio range of its adjacent data network nodes. In addition, the ERRA protocol uses a special coding method for sending connection change messages, which are designated as ERRA_Request (ERRA_REQ), for short.

Figure 1:
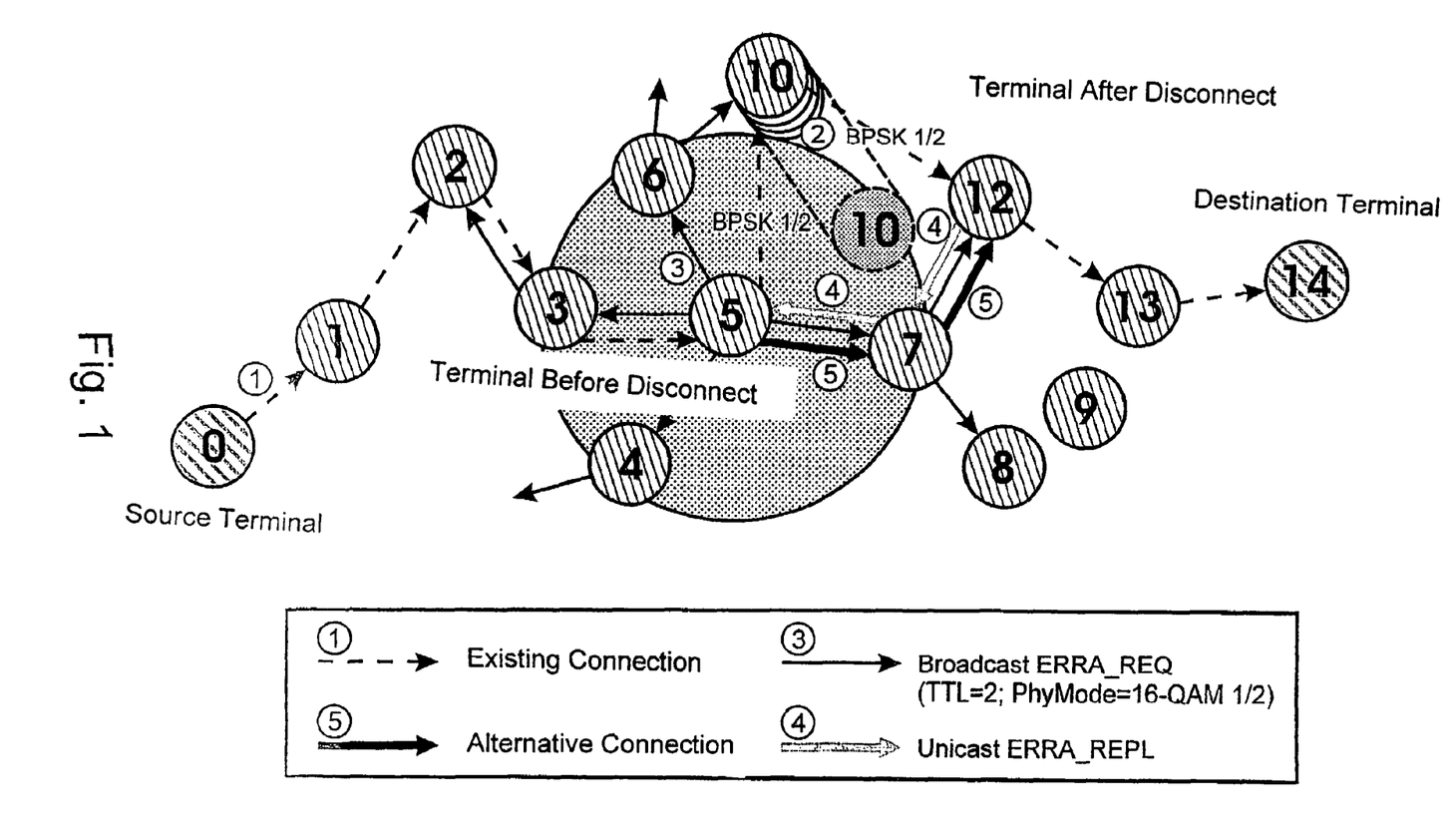
FIG. 1 shows an exemplary embodiment of the present invention having a first data network having a plurality of data network nodes.

For example, FIG. 1 shows the sequence of the ERRA protocol in light of a first data network having altogether 14 data network nodes (numbered through from 1-14). In the data network shown, there is a first data connection (shown as a broken line) from a source terminal 0 to a destination terminal 14. The first data network is a radio network and the data network nodes are accordingly radio terminals.

At the beginning, a routing protocol such as, for instance, AODV, has set up a multihop data connection from source terminal 0 to destination terminal 14 (in FIG. 1 designated as ①). After setting up this data connection, and after the beginning of a data transport over this data connection, a data network node or a radio terminal 10 moves away from the set-up route (designated in FIG. 1 as ②). The quality of the data connection between the adjacent data network nodes or radio terminals 5 and 10 thereby changes. A coding adaptation used in the data network may react to this, in that the coding of transmitted data between the two data network nodes 5 and 10 is adapted in such a way that, in spite of the reduced data connection quality, a sufficiently stable data transmission is able to take place between the two data network nodes 5 and 10. These changes or adaptations of the coding are observed by data network node 5. If a prespecified boundary value is exceeded, that is, for example, in response to the use of a prespecified coding based on a particularly bad connection quality between data network nodes 5 and 10, data network node 5 initiates the ERRA protocol mentioned.

To do this, data network node 5 emits an ERRA_REQ message (denoted by ③ in FIG. 1) that is addressed to all data network nodes which are able to receive this message, in the present case, data network nodes 3, 4, 6, 7 and 10. The ERRA_REQ message includes the following entries: The number of transmissions (also designated as time to life (TTL)) and the IP address of the destination terminal and the source terminal 14 and 0, respectively.

Each data network node or each radio terminal that receives this message and knows a route to destination terminal 14, or which may even be the destination terminal itself, replies with an ERRA_REP message (in FIG. 1, the ERRA_REP message is denoted by ④; in FIG. 1 it is also denoted as ERRA_REPL). If a data network node receives the ERRA_REQ message without knowing destination terminal 14, it reduces the TTL field contained in the message by 1, and, on its part, transmits the message thus changed to all its adjacent data network nodes. If a data network node receives an ERRA_REQ message having a TTL field that is 0, this message is no longer passed on by the receiving data network node. The ERRA method provides that the ERRA_REQ message is more sensitive, i.e., is coded higher than the data packets transmitted between the two data network nodes 5 and 10. This prevents data network node 10 from being able to receive the ERRA_REQ message on a direct path, that is, by its old predecessor, and from replying using its current route, which, to be sure, is supposed to be changed in the future. This method leads to a second data connection which uses a higher coding, and which accordingly has a better channel quality than the first data connection (denoted in FIG. 1 by ⑤).

As shown in FIG. 1, the second data connection includes terminals 1, 2, 3, 5, 7, 12 and 13 as data network nodes. In place of data network node 10 of the first data connection, in the second data connection the data traffic between source terminal and destination terminal 0 and 14, respectively, is now conducted via data network node 7.

As an alternative to sending the ERRA_REQ message with a higher coding than the coding that is used between data network nodes 5 and 10 of the first data connection, data network node 5 may discard a direct reply from data network node 10, since it knows that data network node 10 is replying using the route that is to be replaced, or rather the first data connection.

After data network node 5 has received the ERRA_REP message, having an alternative route proposal or rather a second data connection, it is able to decide whether it wishes to use the alternative route or the second data connection, or whether the old route or the first data connection should continue to be used. The basis of this decision may, for example, be the number of data network nodes which participate in the second data connection or alternative route. If the new route or the second data connection includes more data network nodes or source terminals than the old route or the first data connection, data network node 5 or the initiator of the search for an alternative route may communicate this to source terminal 0, using a so-called ERRA_INFO message. Based on this message, source terminal 0 is able to decide whether the new route or second data connection should be accepted or whether a search should be made for an additional new route or third data connection as an alternative to the first data connection.

As shown in FIG. 1, a BSPK (binary phase shift keying) ½ method is used as the coding method of the part of the data connection between data network nodes 5, 10 and 12. The ERRA_REQ message is ½ encoded using 16 QAM (quadrature amplitude modulation). It is thereby not possible for data network node 10 to decode the ERRA_REQ message from data network node 5. Thus, in this case, the emitted ERRA_REQ message from data network node 5 is encoded differently than the data packets that are able to be received by data network node 10, if they were sent by data network node 5.

Figure 2:
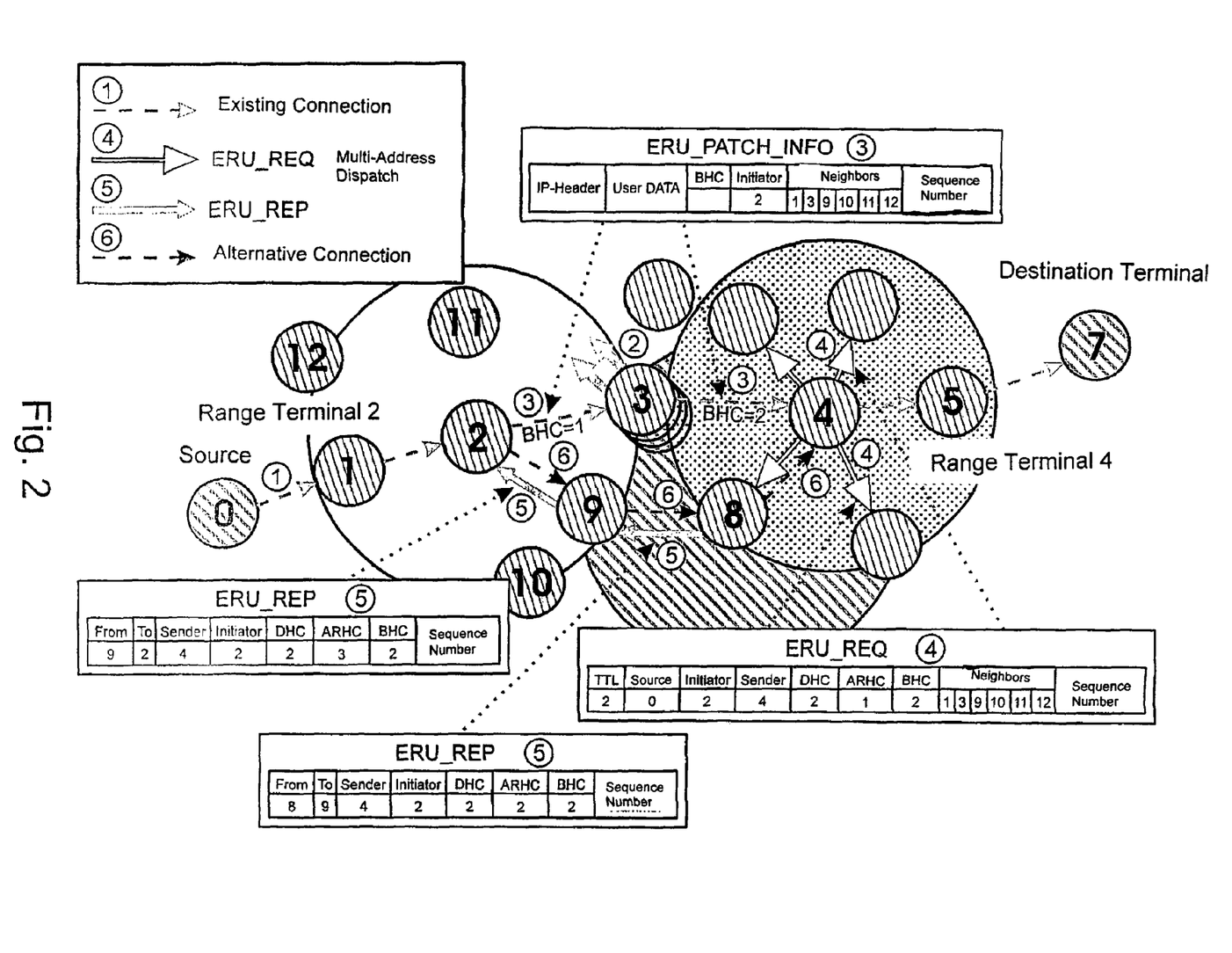
FIG. 2 shows an exemplary embodiment of the present invention having a second data network having a plurality of data network nodes.

The exemplary embodiment of the method according to the present invention, shown in FIG. 2, utilizes a special situation that is created by the prediction of the behavior of the quality of a data connection. At a point in time at which the prediction reports the imminent disconnection of a data connection, this data connection still exists. The data network nodes of the data connection that are situated within the region of the interruption of the data connection may have the possibility to jointly search for a second data connection that will bridge the gap occurring due to the interruption of the first data connection. The method and device designated below as early connection renewal or early route update (ERU) makes use of this.

Again, it is assumed that, in a second data network having a source terminal 0 and a destination terminal 7 as well as data network nodes, at the beginning a first data connection exists between source terminal 0 and destination terminal 7, (denoted in FIG. 2 by ①). The first data connection is shown as a broken line and includes data network nodes 1, 2, 3, 4 and 5.

Data network node 3 moves away from its adjacent data network nodes 2 and 4, so that, in this region, the first data connection deteriorates, or, stated more precisely, its quality deteriorates (designated in FIG. 2 by ②). Adjacent data network node 2 on the input-side part of the first data connection, which includes source terminal 0, is informed of this. From that, data network node 2 knows that the connection to adjacent data network node 3 will soon disconnect. Thus, it is able to make the prediction that the first data connection will disconnect.

The ERU method assumes that almost every data network node permanently checks its connection to adjacent data network nodes and constantly has a current list in which all its adjacent data network nodes are entered, that are located within radio reach. This table is also designated as a neighborhood table. If the functionality of the permanent monitoring of the connections to the adjacent data network nodes is not available, a data network node is able to search actively for adjacent data network nodes, using so-called ERU_HELLO messages.

The initiator of the ERU method, data network node 2, is now able to add data of its adjacent data network nodes, designated also as PATCH_INFO, to a normal data packet (designated as ③ in FIG. 2). In the data network shown in FIG. 2, data network node 2 would add to a data packet as PATCH_INFO that its adjacent data network nodes are 1, 3, 9, 10, 11 and 12. This represents the neighborhood table that was mentioned. Furthermore, PATCH_INFO includes the address of the initiator data network node, in the present case, the address of data network node 2, as well as a sequence number and a counter for the length of the breaking point of the first data connection. The counter for the length of the breaking point is also denoted as breakage hop counter (BHC). This PATCH_INFO message is transmitted with a data packet from data network node 2, for instance, to data network node 3.

With the first transmission, the BHC is set to 1. Data network node 3 has meanwhile been informed by its own prediction unit about the quality of the data connection to adjacent data network nodes via the change in the qualities of the data connections input to it and output from it. Data network node 3 thereby detects that the data connections threaten to disconnect, increases the BHC by 1 and forwards the PATCH_INFO message, together with the data packet received from data network node 2, to data network node 4.

Data network node 4 recognizes the PATCH-INFO message and furthermore recognizes that only its incoming data connection, that is, the data connection between it and data network node 3, is changing. It may conclude from this that its position is remaining stable, but that data network node 3 is moving away. It separates the PATCH-INFO message from the received data packet, and sends an ERU_REQ message to all its adjacent data network nodes (denoted by ④ in FIG. 2). The number of hops (TTL) for this multi-address message is selected as a function of the BHC (in this case, TTL=2). The ERU_REQ message to all adjacent data network nodes includes two additional counters, one for the hops of the alternative second data connection (alternative route hop counter AHRC) and one for the hops to destination terminal 7 (destination hop counter DHC). The ARHC is 1 at the first transmission, and is increased by 1 at each additional transmission. The DHC includes the distance to destination terminal 7 in hops. The TTL is reduced by 1 at each dispatch. The ERU_REQ message is dispatched as long as the TTL is greater than 0.

In the situation shown in FIG. 2, the ERU_REQ message may be dispatched once by data network node 4, since data network node 8 knows one of the adjacent data network nodes and replies directly in the direction of the initiator with an ERU_REP message (denoted by ⑤ in FIG. 2). The other adjacent data network nodes pass on the ERU_REQ message according to the TTL.

If the initiating data network node 2 receives the ERU_REP message with an alternative route, it may decide whether it wishes to use it. If the DHC and ARHC are different, that is, the number of hops is changing, then initiating data network node 2 must inform source terminal 0 about it using a message ERU_INFO.

In the ERU_REQ message, the address of source terminal 0 is also included. If this address is known to a data network node, that is, if source terminal 0 is directly adjacent to this data network node, this data network node may reply directly to source terminal 0, which informs the initiating data network node by an ERU_INFO message. In light of the DHC, source terminal 0 is then able to recognize whether and how the number of hops has changed. Using the ERU method, the alternative data connection maximally may reach the length of the breaking point of the first data connection plus 2 hops. The alternative route is denoted by ⑥ in FIG. 2.

Figure 3:
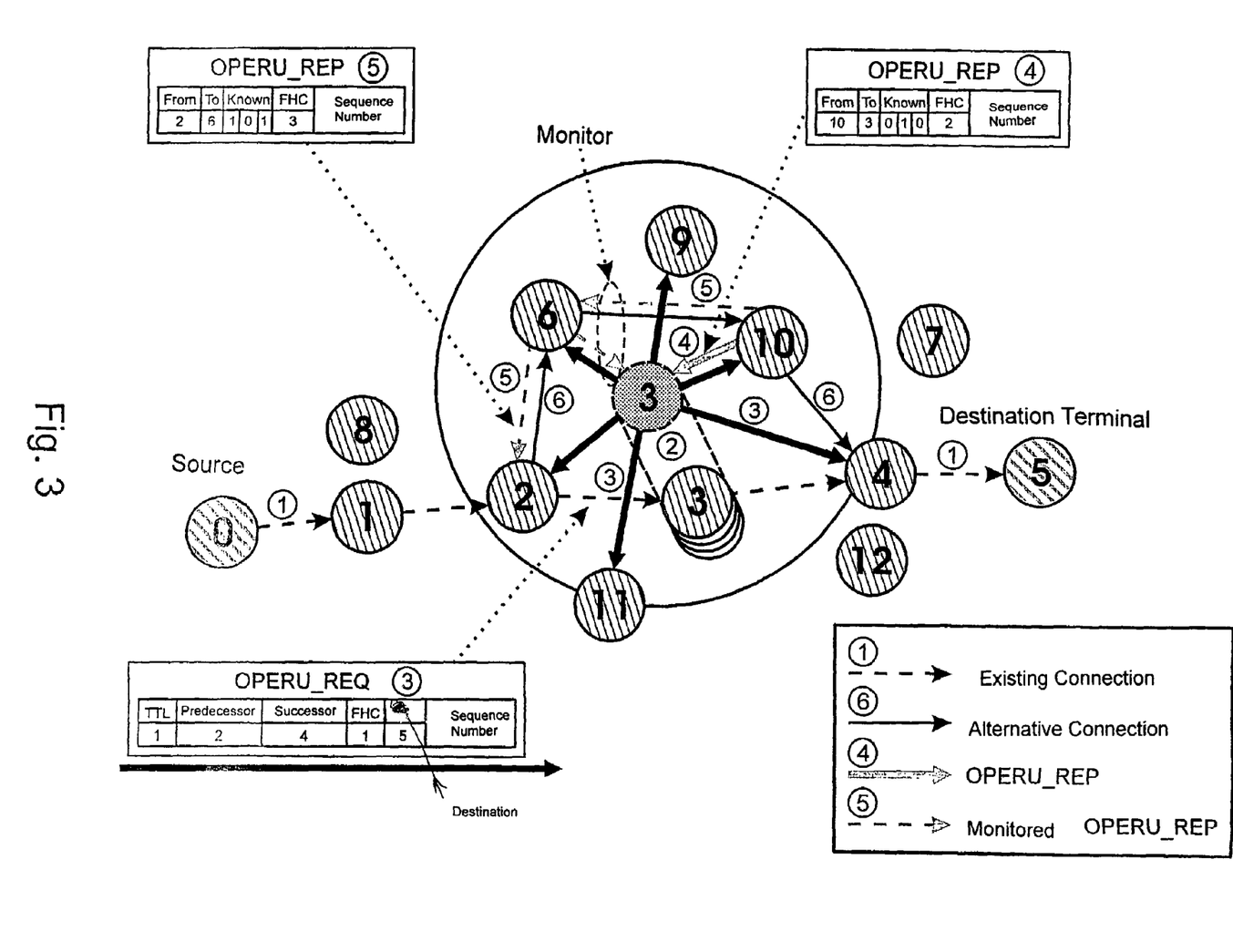
FIG. 3 shows an exemplary embodiment of the present invention having a third data network having a plurality of data network nodes.

The third exemplary embodiment of the method according to the present invention shown in FIG. 3 may be suitable for breaking points in a data connection which are triggered by individual data network nodes that are moving away from the data connection. At the beginning, as shown in FIG. 3, a first data connection from a source terminal 0 to a destination terminal 5 exists in a third data network having several mobile data network nodes. The data connection includes data network nodes 1, 2, 3 and 4, and is shown by a broken line in FIG. 3, as well as being denoted by ①. Data network node 3 of the first data connection now moves away from its original place (denoted in Figure by ②). The third exemplary embodiment of the method according to the present invention may be based on an optimized early connection renewal, also designated as optimized early route update (OPERU). The OPERU method is initiated by data network node 3, that is moving. With the aid of its prediction unit, data network node 3 learns that all data connections incoming to it and outgoing from it will soon disconnect because of its movement.

Data network node 3 reacts to this by sending an OPERU_REQ message (denoted by ③ in FIG. 3). This message includes the address of predecessor data network node 2 of moving data network node 3, of successor data network node 4 of moving data network node 3, and of destination terminal 5, as well as a counter for the number of hops to the destination. In addition, it includes a sequence number. The OPERU_REQ message is sent only locally to the adjacent data network nodes by moving data network node 3, i.e., to data network nodes 2 and 4.

At this point, several situations may arise:

1. At least one of the addressed data network nodes 2 and 4 replies with an OPERU_REP message to the OPERU_REQ message of moving data network node 3. In this reply message, the corresponding data network node 2 or 4 confirms that it knows the predecessor data network node and the successor data network node or destination terminal 5. An alternative route or a second data connection is thereby found as replacement for the first data connection.

2. At least two data network nodes reply to the OPERU_REQ message. One data network node replies that it knows the predecessor data network node, and one data network node replies that it knows the successor data network node or the destination terminal. At this point, an additional case differentiation may be carried out:

a) A data network node replies with an OPERU_REP message if either predecessor data network node, successor network node or destination terminal is known (denoted in FIG. 3 by ④). If another data network node receives the OPERU_REP message and if it knows the other side of the breaking point of the first data connection, and has also received this OPERU_REP message, it sends its own OPERU_REP message directly to the predecessor data network node of the breaking point. A 3-hop connection may be set up between two breaking points.

b) Several data network nodes reply to the OPERU_REQ message. In this case, too, both sides of the breaking point of the first data connection are represented; however, no alternative second data connection is set up. In order, nevertheless, to be able to find a route, data network node 3 sends a new OPERU_REQ message. This includes the adjacent data network nodes that have replied, and their known data network nodes. If there is a data network node that has two data network nodes from the OPERU_REQ message from both sides of the breaking point adjacent to it, then there exists a 4 hop connection as an alternative. This data network node replies with an OPERU_REP message directly in the direction of the predecessor data network node.

3. No data network node replies to the OPERU_REQ message, or data network nodes reply with adjacent data network nodes of the same side of the breaking point. In that case, the OPERU method fails.

If the predecessor data network node receives an OPERU_REP message with an alternative route, it is able to accept the route or continue to use the previous route. If the predecessor data network node accepts the new route, and if the number of hops of the data connection between source terminal and destination terminal thereby changes, the predecessor data node has to inform source terminal 0 about the new situation, using an OPERU_INFO message. Upon receiving the OPERU_INFO message, on its part, source terminal 0 decides whether it accepts the changes in the route, or whether, instead, it will initiate a new route search.

In summary, it should be mentioned that, of all the methods explained above, the OPERU method requires the least signaling. Therefore, the methods may also be used jointly, in a staggered manner. In this case, there is the opportunity of using the OPERU method as the first method. Within the OPERU method, the predecessor data network node of a breaking point also notices that, using the OPERU method, a second data connection or an alternative route is being searched for. The predecessor data network node then sets a timer OPERU_MAX_DURATION. If it receives no reply within the time period specified by the timer, it then triggers the ERU method. If this method also does not lead to success, the ERRA method is started as the last local possibility, since the ERRA method is able to make do even without a data connection.

If all local methods for searching for a new data connection fail, the source terminal is so informed. The latter will then begin, as provided in the standard method, a new route search, or it will notify the requesting service that, at the moment, no route to the destination terminal is able to be found.

Thus, using the present invention, in data networks having data connections that have a greatly fluctuating transmission quality, it is possible to switch to alternative data connections quickly and without great effort. Because of that, in spite of the changing quality of data connections, one may achieve a high data throughput and a low delay in data transmission, accompanied by a small signalizing expenditure. The present invention is suitable for use in multi-hop radio communications networks having mobile radio terminals as relay stations or data network nodes. In such a data network, the quality of an existing data connection can change very rapidly, so that, without using the present invention, only a small data throughput and great delays in transmission will occur. On the other hand, using the present invention, it is possible to achieve a relatively high data transmission rate and low delay times, especially in the transmission of data packets, with only little technical expenditure. This works out especially advantageously for end-to-end connections via which, for example, multimedia data are being transmitted.

What is claimed is:

1. A method for controlling data connections in a data network having a plurality of data network nodes, comprising:

assessing a quality of a first data connection in the light of an adaptation of at least one coding used for the first data connection, wherein, depending on the assessing of the quality of the first data connection, setting up a second data connection to be used as replacement for the first data connection, wherein the assessment of the quality of the first data connection is made in that, in the light of the codings used, at least one first data network node, participating in the first data connection, makes a statement as to whether the first data connection is becoming unstable, wherein in response to the statement that the first data connection is becoming unstable, the at least one first data network node initiates the search for a second data connection, wherein the search is initiated by sending a first message from the at least one first data network node to second data network nodes, and wherein the first message includes the number of transmissions, the address of a transmitter and the address of a receiver of data of the first data connection.

2. The method as recited in claim 1, wherein the first message is processed having a different coding than the coding(s) used in the first data connection.

3. The method as recited in claim 1, wherein the other coding is a higher coding than the coding(s) used in the first data connection.

4. The method as recited in claim 1, wherein the second data connection is utilized when the first data connection is disconnected.

5. A device for controlling data connections in a data network comprising:

a plurality of data network nodes; and a first data connection having a quality, wherein the plurality of data network nodes which are developed so that the quality of the first data connection is assessed in view of an adaptation of at least one coding used for the first data connection, and, depending on the assessment, a second data connection is set up that is used as replacement for the first data connection, wherein at least one first data network node, of the plurality of data network nodes, participating in the first data connection is developed to undertake the assessment of the quality of the first data connection in that, in view of the coding used, makes a statement as to whether the first data connection is becoming unstable, wherein the at least one first data network node may be additionally designed so that, in response to the statement that the first data connection is becoming unstable, the at least one first data network node initiates a search for the second data connection, wherein the at least one first data network node is developed to initiate the search by sending a first message to at least one second data network node, and wherein the first message includes a number of transmissions, an address of a transmitter, and an address of a receiver of data of the first data connection.

6. The device as recited in claim 5, wherein the first message has a different coding than the coding used in the first data connection.

7. The device as recited in claim 6, wherein the different coding is a higher coding than the coding used in the first data connection.

8. The device as recited in claim 5, wherein if the first data connection is threatening to disconnect then a switchover to the second data connection occurs.

9. The device as recited in claim 5, wherein if a specified coding is used for the first data connection then a switchover to the second data connection occurs.

10. The device as recited in claim 5, wherein the data network includes a radio data network and at least two data network nodes are radio terminals.

11. The method as recited in claim 1, wherein if a specified coding is used for the first data connection then a switchover to the second data connection occurs.

* * * * *

UNITED STATES PATENT AND TRADEMARK OFFICE
CERTIFICATE OF CORRECTION

| | |
|---|---|
| PATENT NO. | : 7,580,421 B2 |
| APPLICATION NO. | : 10/559071 |
| DATED | : August 25, 2009 |
| INVENTOR(S) | : Hischke et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 749 days.

Signed and Sealed this

Fourteenth Day of September, 2010

David J. Kappos
*Director of the United States Patent and Trademark Office*